Sept. 22, 1959         J. W. DUGAN         2,905,117

APPARATUS FOR MIXING FERTILIZER SOLUTIONS FOR SOIL CONDITIONING

Original Filed Feb. 27, 1953         2 Sheets-Sheet 1

John W. Dugan
INVENTOR.

BY
Attorneys

Sept. 22, 1959     J. W. DUGAN     2,905,117
APPARATUS FOR MIXING FERTILIZER SOLUTIONS FOR SOIL CONDITIONING
Original Filed Feb. 27, 1953     2 Sheets-Sheet 2
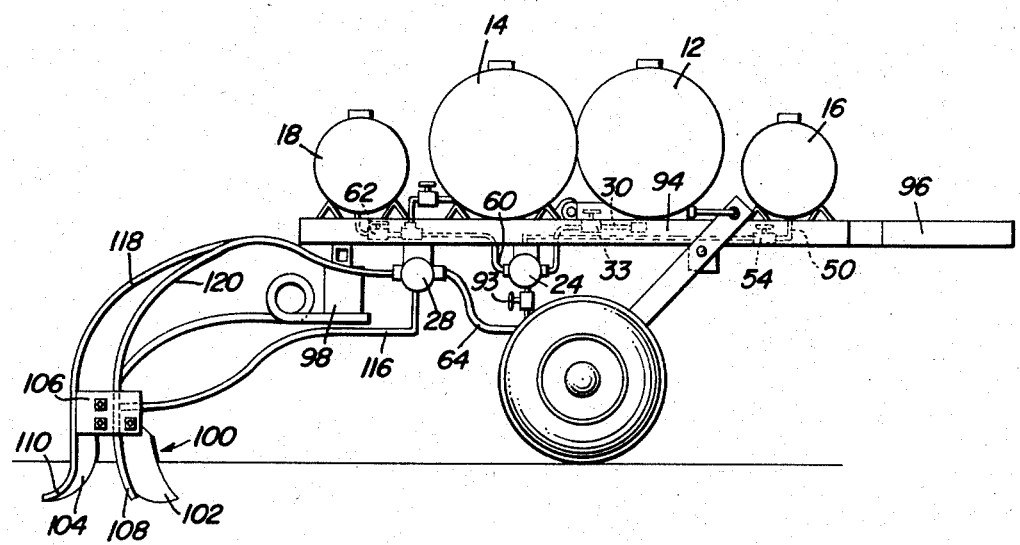
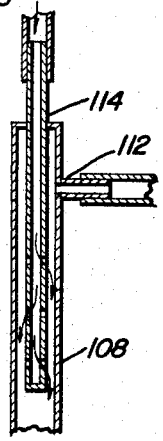
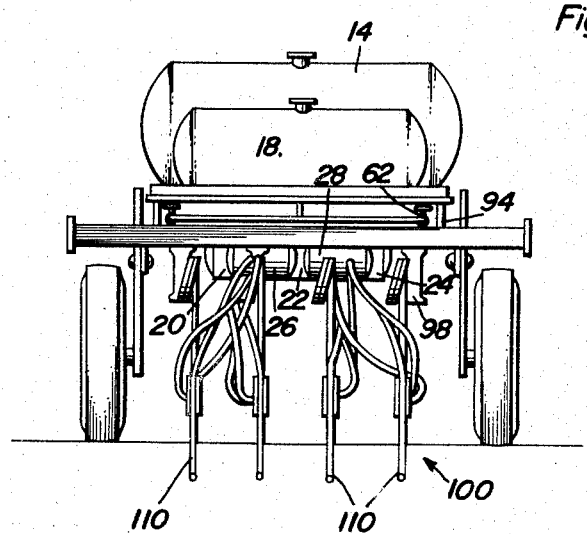
John W. Dugan
INVENTOR.

_United States Patent Office_  2,905,117
Patented Sept. 22, 1959

2,905,117

APPARATUS FOR MIXING FERTILIZER SOLUTIONS FOR SOIL CONDITIONING

John W. Dugan, Houma, La., assignor to Flo-Mix Fertilizers Corporation, Houma, La., a corporation of Delaware Original application February 27, 1953, Serial No. 339,217, now Patent No. 2,781,612, dated February 19, 1957. Divided and this application November 9, 1956, Serial No. 621,247

4 Claims.  (Cl. 111—7)

This is a divisional application containing subject matter divided from my copending application Ser. No. 339,217, now Patent No. 2,781,612, issued February 19, 1957. In the said earlier copending application Ser. No. 339,217 a method of soil fertilization is described which essentially consists in the approximately simultaneous, but separate subsurface injection into the soil of a plurality of liquid streams by means of an applicator attached to a cultivator.

According to the invention all soil nutrients, such as anhydrous ammonia, phosphoric acid or a solution of potash in water may be delivered to the place at which they are used in highly concentrated forms in commercially available containers. The containers with the nutrient and an additional water container are mounted on a suitable mobile frame which also carries the means for the subsurface injection of the nutrient. Obviously, the physical and chemical condition of the soil determines the concentration, the amount, and the type of fertilizer that can be readily assimilated and which will be of greatest benefit to the plants; the condition of the soil and the crop to be planted determine the fertilization needed.

When the mobile frame is moved over an area to be fertilized conduits from the various containers direct the liquid solutions toward the soil. During the passage from the container to the soil the concentration of the streams may be changed in the manner required by dilution of the streams with water.

The streams of ammonia and the potash solution may be combined prior to their entrance into the soil since there is no chemical reaction when these two streams are mixed. The phosphoric acid, of course, will react immediately with the alkaline substances already in the soil to form both organic and inorganic phosphates.

A dilute solution of phosphoric acid may further blanket a stream of anhydrous ammonia so that, nitrogen in the form of anhydrous ammonia and ammonium phosphates, and phosphorus in the form of ammonium phosphates are added to the soil.

The system according to the invention permits numerous permutations and variations according to the soil characteristics, the time at which the fertilizing solutions are applied and the crop to be raised. This is a marked advantage over the present fertilizing processes which for the most part utilize a fixed amount of chemicals and in which variations even if possible are not economically and practically feasible. In contradistinction thereto according to the invention the amount of nitrogen, phosphorus and potassium may be varied in every phase of application.

One of the greatest advantages of the present invention over known methods consists in eliminating the processes or the processing to which the chemicals must be subjected in order to obtain solutions containing high percentages of available nutrients.

By means of the processes of the present invention, liquid fertilizers containing high percentages of available nutrients are formed in moving streams and deposited in the soil immediately after formation. In this way the intermediate manufacturing and handling operations are eliminated.

Alternatively the streams may be applied to the subsurface of the soil simultaneously and separately and the chemical reactions take place within the soil which is the most desirable way of applying the fertilizer and the ultimate objective of a fertilizing operation.

The moving streams are under temperature conditions which allow solutions to exist which at normal temperatures and pressure conditions would be supersaturated solutions. Such solutions when released within the soil immediately precipitate the salts.

The invention may be described with reference to the accompanying drawings, illustrating by way of example one embodiment of the invention. It is however to be understood that the drawing is purely diagrammatic and that the details of the structure may be arranged in many different ways by the expert adjusting the construction to a specific purpose, and a departure from the showing, especially from the the diagrammatic showing is not necessarily a departure from the principle of the invention.

In the drawing:

Figure 2 is a side elevational view of a mobile apparatus for carrying out the process;

Figure 3 is a rear elevational view of the mobile apparatus shown in Figure 2; and Figure 4 is a sectional view of one of the solution mixing tubes.

Figure 1:
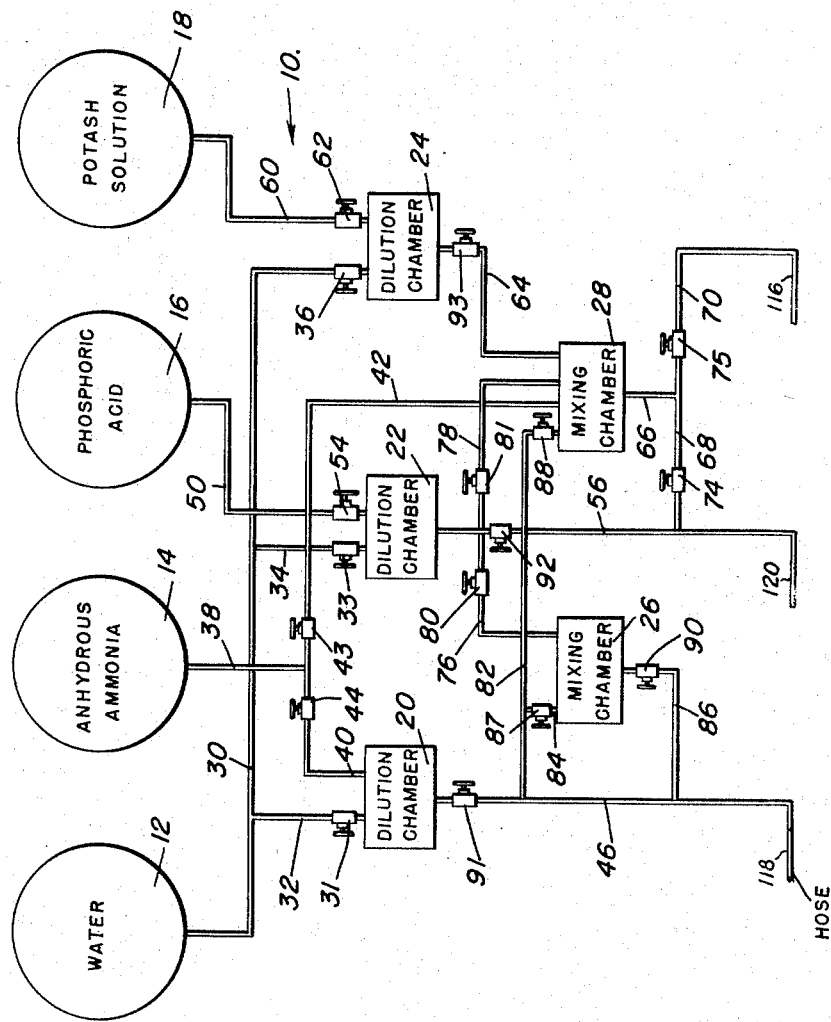
Figure 1 is a flow diagram of the conduit systems for supplying the various nutrients to the applicators.

The supply system according to the principle of the invention, designated by the numeral 10, includes a water tank or container 12, an anhydrous ammonia tank or container 14, a phosphoric acid tank 16 and a potash solution tank or container 18.

Also included in the supply system 10 are three dilution chambers 20, 22 and 24, respectively, and two mixing chambers 26 and 28, respectively.

The piping on the water tank 12 consists of a main conduit 30 opening into the dilution chamber 24 and a pair of branch conduits 32 and 34 extending from the main conduit and opening into the dilution chambers 20 and 22, respectively. Suitable valves 31, 33, 36 are provided on the conduit 30 and branch conduits 32 and 34 for controlling the flow of water to each and to all the dilution chambers.

From the anhydrous ammonia container 14 extends a primary conduit 38 terminating in a pair of branch conduits 40 and 42 with the conduit 40 opening into the dilution chamber 20 and the conduit 42 opening into the mixing chamber 28. Valves 44, 43 are provided on the branch conduits 40 and 42, respectively, so that the flow of ammonia through the primary conduit 38 may be selectively directed to the dilution chamber 20 or the mixing chamber 28. From the dilution chamber 20 extends a conduit 46 which leads directly to hose 118 from which the anhydrous ammonia or aqueous solution of ammonia may be injected directly into the soil.

From the phosphoric acid container 16 extends a primary conduit 50 which opens into the dilution chamber 22. Valve 54 is provided on this conduit to control the flow of acid into the dilution chamber 22.

From the dilution chamber 22 extends a secondary conduit 56 which terminates in hose 120 from whence phosphoric acid, either concentrated or diluted may be injected directly into the soil.

From the potash solution container extends a primary conduit 60 opening into the dilution chamber 24, which conduit is provided with a valve 62 for controlling the flow of the potash solution into the dilution chamber.

Extending from the dilution chamber 24 is a secondary conduit 64 opening into the mixing chamber 28. From the mixing chamber 28 extends a tertiary conduit 66 terminating in a pair of branch conduits 68 and 70 with conduit 68 opening into the conduit 56 and the conduit 70 opening into a hose 116. Valves 74, 75 are provided on the branch conduits 68 and 70 for selectively directing the flow from the mixing chamber 28 to either the hose 120 or hose 116.

From the conduit 56 extend a pair of branch conduits 76 and 78 respectively with conduit 76 opening into the mixing chamber 26 and the conduit 78 opening into the mixing chamber 28. Valves 80, 81 are provided on the conduits 76 and 78 respectively for selectively controlling the flow of phosphoric acid from the dilution chamber 22 to either the mixing chamber 26 or the mixing chamber 28.

From the conduit 46 extends a branch conduit 82 opening into the mixing chamber 28 intermediate the ends of this branch conduit 82 is a connecting conduit 84 opening into the mixing chamber 26. From the mixing chamber 26 extends another conduit 86 which opens in the lower portion of the conduit 46.

Valves 87, 88 on the branch conduit 82 and the connecting conduit 84 respectively control the flow initially from the conduit 46 to the branch conduit 82 and thence selectively control the flow of ammonia from the branch conduit 82 to either the mixing chamber 26 or the mixing chamber 28. Valve 90 on the conduit 86 controls the return of fluid from the mixture chamber 26 to the conduit 46.

The secondary conduits 46, 56 and 64, respectively are also provided with valves 91, 92, 93 to control the direct flow through these conduits to the hoses 118, 120 and 116, respectively.

Flexible hoses 116, 118 and 120 extend either singularly and individually to supply pipes attached to each one of the applicators, or alternatively two flexible hoses 116, 118 extend therefrom to the two supply pipes 112 and 114 of an applicator, for instance the one attached to cultivator blade 102, in Figure 2, when the type of applicator shown in Figure 4 is used, and the third hose 120 is connected to another applicator for instance the one attached to cultivator 104 (Fig. 2) with a single tube, according to another alternative each hose is connected to one of the three supply pipes on an applicator 100 of the type shown in Figure 2 of the drawings.

With this arrangement it can be seen that either solution of various ammonia concentrations or anhydrous ammonia, phosphoric acid and potash solution may be initially distributed through the hoses 48, 58, 72, respectively. Also, by judicious manipulation of the valves around dilution chambers 20 and 22 and mixing chamber 26, selected concentrations of water, anhydrous ammonia and phosphoric acid may be mixed and distributed through the hose 118. Similar adjustments of the valves around the dilution chambers 22 and 24 and the mixing chamber 28 will permit the flow through the mixing chamber 28 of various concentrations of water, phosphoric acid and potash solution which may then be distributed through either of the hoses 120 and 116. Likewise, the flow of anhydrous ammonia and potash solution may be directed through the mixing chamber 28 and the hoses 120 and 116 to the exclusion of phosphoric acid solution.

Briefly, various concentrations of the essential soil nutrients, nitrogen, phosphorus and potassium may be injected directly into the soil through the supply system 10.

The tanks 12, 14, 16 and 18 together with their piping system are mounted on a suitable wheeled frame 94 (Figure 2) having a tongue 96 at the forward end thereof by means of which the frame 94 may be towed by a tractor or the like. Secured to and depending from the rear end of the frame are a plurality of transversely spaced tool bars 98 upon which the combined cultivators and applicators 100 are mounted. As will be noted, each combined cultivator and applicator 100 comprises front and rear plow feet 102, 104 respectively, secured to one another and to the tool bar 98 at their upper ends by means of the attaching plates 106. The plow feet 102 and 104 are in the form of cutting blades having forward or leading edges formed with cutting surfaces for penetrating the ground surface whereas the trailing edge of each of the plow feet has an open ended pipe welded thereto, the pipe 108 benig welded to the trailing edge of the forward plow foot 102 and the pipe 110 being welded to the rear plow foot 104 at its trailing edge. A branch pipe or conduit 112 opens into the side wall of the conduit 108 while the ammonia induction pipe extends concentrically within the pipe 108 and is designated by the numeral 114. It is to be noted that this portion of the apparatus, namely, the forward plow foot 102, pipe 108, branch conduit 112 and the concentric pipe 114 are substantially identical to that described in my copending application Serial No. 318,063, now Patent No. 2,784,530, issued March 12, 1957.

Hose or other flexible conduits 116, 118 and 120 interconnect the pipes 108, 110 as well as the branch conduit 112 with the piping arrangement leading from the nutrient containers. The hose 116 is primarily for the potash solution, the hose 118 for the ammonia and hose 120 for the phosphoric acid.

Since the manner of interconnecting the tanks with one another and diluting the solutions of the tanks is believed to be adequately set forth in the flow diagram of Figure 1, the valve structure necessary for the functioning of the apparatus is not shown in Figures 2–4. However, the primary conduits leading from each tank are designated by the same numerals utilized in the description of the flow sheet shown in Figure 1.

As the frame 94 is drawn over the ground, the plow feet 102, 104 penetrate the soil and allow for the subsoil injection of the liquid fertilizers through the pipes 108, 110.

Although as shown in the preferred embodiment, the combined cultivators and applicators are arranged in side by side relation transverse to the direction of movement of the frame, it is to be understood that these may be arranged in longitudinally spaced relation with respect to the movement of the frame or in various angled positions according to the desires of the operator.

It is to be noted that no attempt has been made to show pressure regulation, flow control, etc., since these features are dependent upon the manner in which the apparatus is to be mounted and equipment capable of performing these functions is already well known in the art.

From the foregoing description, the principles of the invention will be readily apparent. However, since numerous modifications and changes will occur to those skilled in the art after a perusal of the foregoing specification taken in conjunction with the accompanying drawings, it is not desired to limit the invention to the exact embodiment set forth herein, but modifications and changes may be resorted to that fall within the scope of the appended claims.

What is claimed as new is as follows:

1. A cultivating apparatus adapted for operation under varying cultivating conditions provided with cultivator blades and applicators, each of the latter being carried by a cultivator blade and distributing liquid fertilizers by injection of the fertilizer into the subsoil, while moving over the soil, comprising a plurality of fertilizer solution tanks, each adapted to hold a concentrated fertilizing liquid, a water tank, a group of dilution tanks, each connected with the water tank and further connected with one of the fertilizer solution tanks to provide the concentration of the solution which is adapted to the cultivating operation carried out at the time, mixing chambers, each of which is connected with a dilution tank, one of said mixing chambers being additionally directly connected with one of the fertilizer solution tanks, means connecting each applicator with a dilution tank and further means connecting said applicator with one of said mixing chambers, each of said means including a control member, the alternative manipulation of the said control members alternatively providing the applicators with fertilizers of a predetermined concentration or with mixed fertilizer solutions, or providing a direct flow from one of the fertilizer solution tanks to an applicator.

2. A cultivating apparatus adapted for operation under varying cultivating conditions provided with cultivator blades and with applicators, each applicator being carried by a cultivator blade and distributing liquid fertilizer within the subsoil by moving over the ground, comprising a cultivator frame supporting a group of tanks holding concentrated fertilizer solutions, one of said tanks containing anhydrous ammonia, a water tank, a group of dilution tanks, each connected to provide the concentration of the injected fertilizer fluid adapted to the cultivating operation carried out at the time, means for controlling the admission of fertilizer solution and water to the dilution tanks, a group of mixing chambers, each connected with a plurality of dilution tanks, valve means controlling the connection between the mixing chambers and the dilution tanks, a direct connection between one of the mixing chambers and the tank containing anhydrous ammonia, connections between each mixing chamber and one of the applicators, further connections between said applicators and the dilution tanks, and means for controlling the connections between the dilution chambers and the applicators, the mixing chambers and the applicators, and a direct connection between the anhydrous ammonia tank and one of the mixing chambers.

3. A cultivating apparatus adapted for varying cultivating conditions, provided with cultivator blades, each carrying an applicator distributing varying combinations of fertilizing solutions in the subsoil while moving over the ground, comprising a cultivator frame supporting a group of fertilizer solution tanks, each holding a concentrated fertilizer solution, one of said tanks containing anhydrous ammonia, a water tank, a group of dilution tanks each connected with one of the fertilizer solution tanks and with the water tank, valve means controlling the admission of fertilizer solution and of water to the dilution tanks, to produce the concentration of the fertilizer to be injected into the soil adapted to the cultivating operation carried out at the time, mixing chambers, connection means between each mixing chamber and a plurality of dilution tanks, valve means controlling the admission of liquid solutions from the dilution tanks to the mixing chambers, a direct connection between one of the mixing chambers and the fertilizer solution tank containing anhydrous ammonia, means connecting some applicators with a dilution tank and further means connecting each mixing chamber with an applicator, and additional valve controlled connection means between the mixing chamber connected with the anhydrous ammonia tank and a plurality of applicators.

4. A fertilizer distribution system adapted for use under varying cultivating conditions, and distributing nitrogen, phosphorus and potassium containing fertilizing solutions within the subsoil, while in movement over the ground, comprising a cultivator frame, a plurality of cultivator blades, each carrying an applicator for injecting fertilizing solutions into the subsoil, rendered accessible by the moving cultivator blades, and provided with feeding connections, one of said applicators being provided with means for injecting a plurality of streams of fertilizing solutions into the soil blanketing each other, each stream being supplied by a separate feeding connection, a group of tanks holding concentrated fertilizer solutions, one of said tanks holding anhydrous ammonia, another tank containing phosphoric acid, and a further tank containing a potash solution, a water tank, a group of dilution tanks, controllable connection means between each dilution tank and the water tank and between each dilution tank and one of the concentrated fertilizer solution tanks to produce a concentration of the fertilizer solution injected into the soil suitable for the cultivating operation carried out at the time, a group of mixing chambers, controllable connection means between each mixing chamber and a plurality of dilution tanks, an additional connection between one of the mixing chambers and the solution tank containing anhydrous ammonia, and control means in said additional connection, a connection between each applicator and a dilution tank and a further connection between each applicator and a mixing chamber, one mixing chamber having two outlets each provided with a control means, one of the outlets being connected with a connection between an applicator and a dilution tank and being adapted to be connected, in conformity with the cultivating operation carried out at the time, with an applicator injecting a single stream or with an applicator injecting a double stream, respectively.

References Cited in the file of this patent
UNITED STATES PATENTS

| 2,415,251 | Leavitt | Feb. 4, 1947 |
| 2,486,512 | Armstrong | Nov. 1, 1949 |

FOREIGN PATENTS

| 132,025 | France | July 30, 1879 |

OTHER REFERENCES

Information For Fruit Growers . . ., Farmers Bulletin 908, U.S. Department of Agriculture (1924), pages 38–40 required.